United States Patent [19]

Gubitz et al.

[11] Patent Number: 5,575,360
[45] Date of Patent: Nov. 19, 1996

[54] SHOCK ABSORBER ASSEMBLY FOR A MOTOR VEHICLE, THE SHOCK ABSORBER ASSEMBLY HAVING A PNEUMATIC SPRING

[75] Inventors: Holger Gubitz, Schweinfurt; Heinz-Joachim Gilsdorf, Donnersdorf, both of Germany

[73] Assignee: Fichtel & Sachs AG, Schweinfurt, Germany

[21] Appl. No.: 380,029

[22] Filed: Jan. 30, 1995

[30] Foreign Application Priority Data

Jan. 31, 1994 [DE] Germany .......................... 44 02 750.8
Mar. 4, 1994 [DE] Germany .......................... 44 07 263.5

[51] Int. Cl.$^6$ ............................................. F16F 9/04
[52] U.S. Cl. ..................... 188/298; 280/710; 267/64.24
[58] Field of Search ..................... 188/298; 280/709, 280/708, 710; 267/64.19, 64.23, 64.21, 64.24, 64.27; 29/235, 434, 436, 450, 451, 516

[56] References Cited

U.S. PATENT DOCUMENTS

| | | | |
|---|---|---|---|
| 3,149,830 | 9/1964 | Broadwell | 267/64.24 |
| 3,176,388 | 4/1965 | Dutton | 29/450 |
| 3,744,123 | 7/1973 | Vers | 188/322.17 |
| 3,797,816 | 3/1974 | Voss | 267/64.24 |
| 4,392,293 | 7/1983 | Yamaguchi | 267/64.24 |
| 4,758,361 | 7/1988 | Karol | 252/48.6 |

FOREIGN PATENT DOCUMENTS 3038013  4/1981  Germany .

Primary Examiner—Robert J. Oberleitner
Assistant Examiner—C.T. Bartz
Attorney, Agent, or Firm—Nils H. Ljungman and Associates

[57] ABSTRACT

Pneumatic spring comprising an elastic rolling bellows connected to a tubular body. The elastic rolling bellows, together with an essentially rigid external tube, forms a spring chamber. A bellows fastening is disposed between the rolling bellows and the external tube, whereby the rolling bellows are inserted into the external tube in a fastening segment, and are held in place by means of a retaining ring. The retaining ring, by means of its inner surface can act as a guide with respect to the rolling bellows connected to the tubular body, so that the external tube is kept at a distance with respect to the part of the rolling bellows connected to the tubular body.

14 Claims, 5 Drawing Sheets

BACKGROUND INFORMATION

BACKGROUND INFORMATION

SHOCK ABSORBER ASSEMBLY FOR A MOTOR VEHICLE, THE SHOCK ABSORBER ASSEMBLY HAVING A PNEUMATIC SPRING

BACKGROUND OF THE INVENTION

1. Field of the Invention

The present invention generally relates to a pneumatic spring, the pneumatic spring comprising elastic rolling bellows, which bellows are connected to a tubular body. The rolling bellows, together with an essentially rigid external tube, form a spring chamber. The pneumatic spring also generally includes a bellows fastening between the rolling bellows and the external tube, whereby the rolling bellows are inserted into the external tube in a fastening segment, and are held in place by means of a retaining ring.

2. Background Information

Such a pneumatic spring is disclosed, for example, in German Patent Application No. 30 38 013. In the presence of unfavorable operating influences and manufacturing tolerances, the external tube can get into an inclined or skewed position, so that the retaining ring comes into contact with the bellows part which in contact with the tubular body. If this inclined position is a frequent occurrence, the rolling bellows can be damaged. The same consequences are experienced when, on account of a technical problem, the pneumatic spring is moved when it is unpressurized.

OBJECT OF THE INVENTION

The object of the present invention is to refine a pneumatic spring so that the problems experienced with pneumatic springs of

SUMMARY OF THE INVENTION

The present invention teaches that this object can be achieved if the retaining ring, by means of an inner surface, preferably acts as a guide with respect to the rolling bellows part which is connected to the tubular body, so that the external tube can be held at a distance from the rolling bellows part. Because contact between the external tube and the rolling bellows part which is in contact with the tubular body is essentially prevented, virtually no abrasion damage to the rolling bellows can occur. Moreover, the present invention teaches that the retaining ring can advantageously have anti-friction properties, at least on its inner surface, with respect to the surface of the rolling bellows. In this manner, the retaining ring can exhibit good performance characteristics under what could be considered to be emergency conditions.

Another advantageous characteristic of the present invention is that the retaining ring, over its axial length, can preferably have at least one change in its cross section in the radial direction. This change in cross section, in accordance with one preferred embodiment, can preferably result in a shell-like surface on the retaining ring. This shell-like surface can act as a clamping surface, which clamping surface can preferably fix the rolling bellows in position with respect to the external tube. For that purpose, the end of the external tube needs to be subjected to essentially only a slight deformation. The wall thickness of the external tube can be made thinner than in the past, essentially because an elastic deformation of the external tube is permitted. The external tube can thereby perform the clamping function. In other words, and in accordance with one embodiment, the external tube can preferably clamp the rolling bellows against the shell surface of the retaining ring.

The change in cross section in the retaining ring, e.g. in the form of a concave shell surface, can also preferably be used to center the retaining ring during assembly.

When the word "invention" is used in this specification, the word "invention" includes "inventions", that is the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the invention resides broadly in a shock absorber assembly for a motor vehicle, the shock absorber assembly having a pneumatic spring, the shock absorber assembly comprising: a sealed cylinder defining a chamber therein, the cylinder containing a damping medium; the cylinder having a first end portion and a second end portion disposed a substantial distance away from the first end portion; a piston rod sealingly projecting into the first end portion of the cylinder and being axially displaceable with respect to the cylinder; the piston rod having a longitudinal axis defining an axial direction parallel to the longitudinal axis; a piston attached to the piston rod, the piston being slidably disposed within the cylinder to sealingly divide the chamber into a first and second chamber; means for permitting flow of damping medium between the first chamber and the second chamber; an outer tube disposed about at least a portion of the cylinder; pneumatic spring means for applying a substantially axially directed force to the outer tube; means for fastening the pneumatic spring means to the outer tube; the pneumatic spring means comprising: a tubular bellows portion comprising a first portion immediately surrounding and making contact with the cylinder, and a second portion for being fastened to the outer tube; the first portion and the outer tube defining at least a portion of a spring chamber therebetween, the spring chamber for applying the substantially axially directed force to the outer tube; and means for maintaining a substantial radial distance between the outer tube and the first portion, to minimize contact between the outer tube and the first portion.

Another aspect of the invention resides broadly in a method of assembling a shock absorber for a motor vehicle, the shock absorber assembly comprising: a sealed cylinder defining a cheer therein, the cylinder containing a damping medium; the cylinder having a first end portion and a second end portion disposed a substantial distance away from the first end portion; a piston rod sealingly projecting into the first end portion of the cylinder and being axially displaceable with respect to the cylinder; the piston rod having a longitudinal axis defining an axial direction parallel to the longitudinal axis; a piston attached to the piston rod, the piston being slidably disposed within the cylinder to sealingly divide the cheer into a first and second chamber; means for permitting flow of damping medium between the first chamber and the second chamber; an outer tube disposed about at least a portion of the cylinder; pneumatic spring means for applying a substantially axially directed force to the outer tube; means for fastening the pneumatic spring means to the outer tube; the pneumatic spring means comprising: a tubular bellows portion comprising a first portion immediately surrounding and making contact with the cylinder, and a second portion for being fastened to the outer tube; the first portion and the outer tube defining at least a portion of a spring chamber therebetween, the spring chamber for applying the substantially axially directed force to the outer tube; and means for maintaining a substantial radial distance between the outer tube and the first portion, to minimize contact between the outer tube and the first portion; the method comprising the steps of: providing a sealed cylinder defining a chamber therein; providing a damping medium; providing the cylinder with a first end portion and a second end portion disposed a substantial distance away from the first end portion; providing a piston rod, the piston rod having a longitudinal axis defining an axial direction parallel to the longitudinal axis; providing a piston; providing means for permitting flow of damping medium; providing an outer tube; providing pneumatic spring means for applying a substantially axially directed force to the outer tube; providing means for fastening the pneumatic spring means to the outer tube; the step of providing the pneumatic spring means further comprises: providing a tubular bellows portion; the step of providing the tubular bellows portion further comprises providing the tubular bellows with a first portion and a second portion; providing means for maintaining a substantial radial distance between the outer tube and the first portion; the method further comprising the steps of: filling the chamber of the sealed cylinder with damping medium; attaching the piston to the piston rod; inserting the piston rod and the piston into the first end portion of the cylinder, such that the piston rod sealingly projects into the first end portion of the cylinder and such that the piston sealingly divides the chamber to form a first and second chamber, the piston rod being axially displaceable with respect to the cylinder; permitting flow of damping medium, with the means for permitting, between the first chamber and the second chamber; disposing the first portion of the tubular bellows portion to immediately surround and make contact with the cylinder; disposing the outer tube about at least a portion of the cylinder, the first portion and the outer tube defining at least a portion of a spring chamber therebetween, the spring chamber for applying the substantially axially directed force to the outer tube; fastening, with the fastening means, the second portion of the tubular bellows to the outer tube; and maintaining, with the means for maintaining, a substantial radial distance between the outer tube and the first portion, and minimizing contact between the outer tube and the first portion.

BRIEF DESCRIPTION OF THE DRAWINGS

The present invention is explained in greater detail below, with reference to the embodiments illustrated in the accompanying drawings, in which.

DESCRIPTION OF THE PREFERRED EMBODIMENTS

Figure 1A:
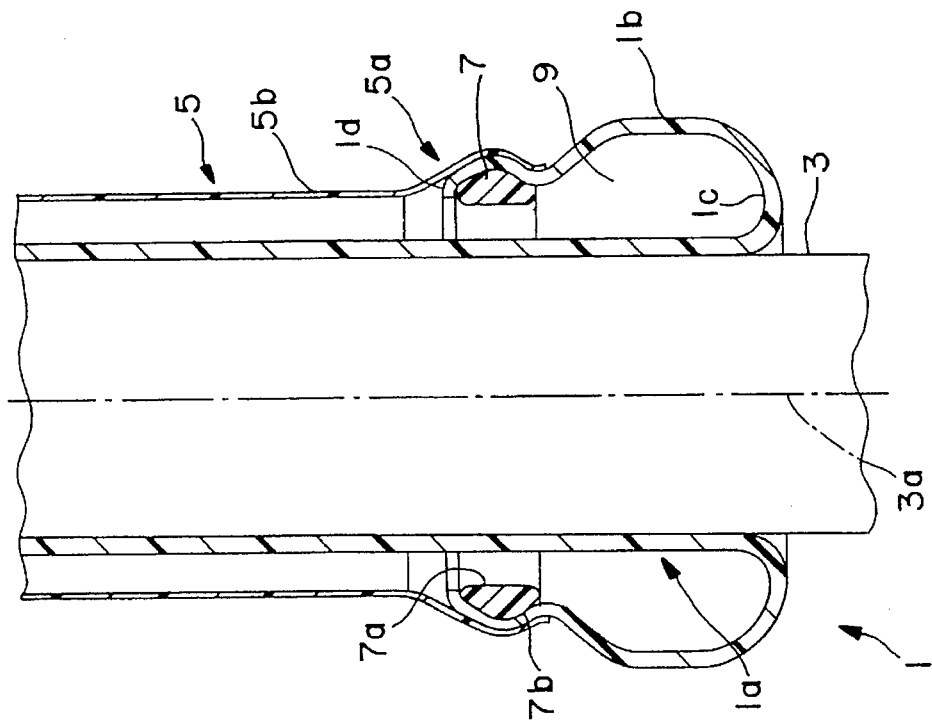
FIG. 1a shows substantially the same view as FIG. 1, but shows additional details.
Figure 1:
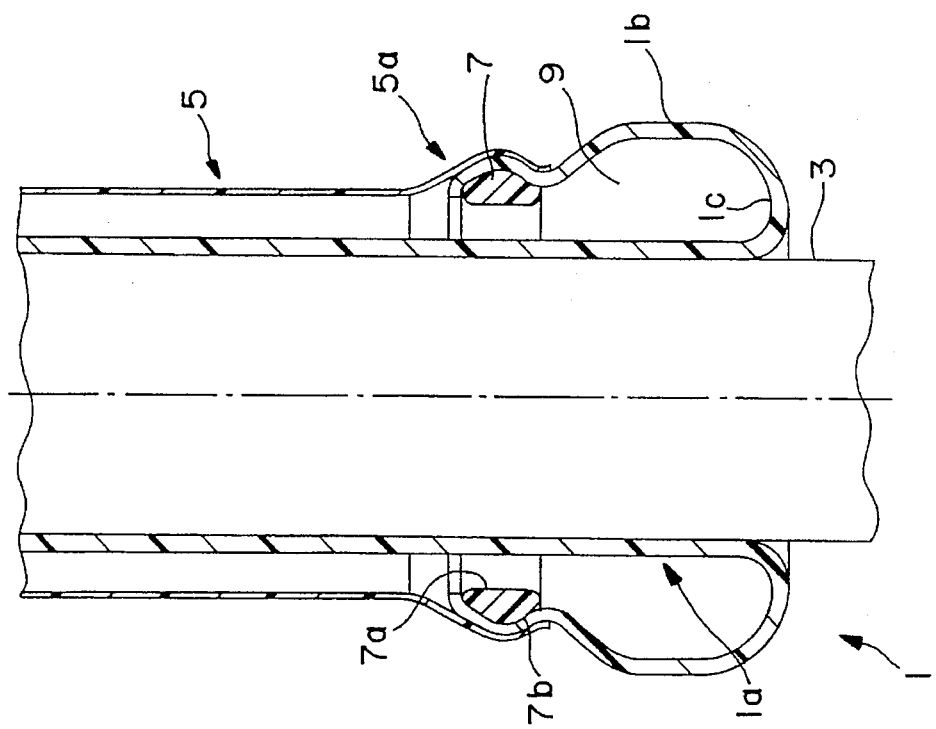
FIG. 1 shows a partial view of a pneumatic spring in cross section.

FIG. 1 shows the essential part of a pneumatic spring. The pneumatic spring can generally include a rolling bellows 1 having a first part 1a and a second part 1b. The first part 1a of the rolling bellows 1 can preferably be fastened to a tubular body 3. In accordance with one preferred embodiment of the present invention, tubular body 3 can be considered to represent an outer tube or cylinder of a shock absorber, such as that shown in FIG. 2 discussed further below. The second part 1b of the rolling bellows 1 can be fastened, by means of a retaining ring 7, to a fastening segment 5a of an external tube 5. The external tube 5 can preferably be disposed about tubular body 3. The rolling bellows 1 and the external tube 5 preferably form an air-filled spring chamber 9. The rolling bellows 1 can preferably have a bead 1c wherein the rolling bellows 1 can be turned back over itself such that part 1b is disposed substantially about part 1a.

If the pneumatic spring is in an inclined position, or in the event of the loss of compressed air in the spring chamber 9, the retaining ring 7 can act as a guide with respect to the part 1a of the rolling bellows 1. The inclined position of the pneumatic spring, which can hardly be prevented, and is even desirable under some circumstances to compensate for transverse forces, essentially no longer represents a wear situation for the pneumatic spring, and more specifically for part 1a of the rolling bellows 1.

The material of which the retaining ring 7 is made can preferably be selected so that at least the inner surface 7a of the retaining ring 7 is provided with a coating, which coating can preferably be an anti-friction coating. Essentially, a simple retaining ring 7 made preferably entirely of plastic can provide the necessary anti-friction properties, thereby requiring no additional coating on the retaining ring 7.

To prevent major deformations of the external tube 5 in the vicinity of the fastening segment 5a, the retaining ring 7 can preferably have an essentially concave shell surface 7b. The shell surface 7b can act as a clamping surface of the roller bellows 1 with respect to the external tube 5.

Figure 2:
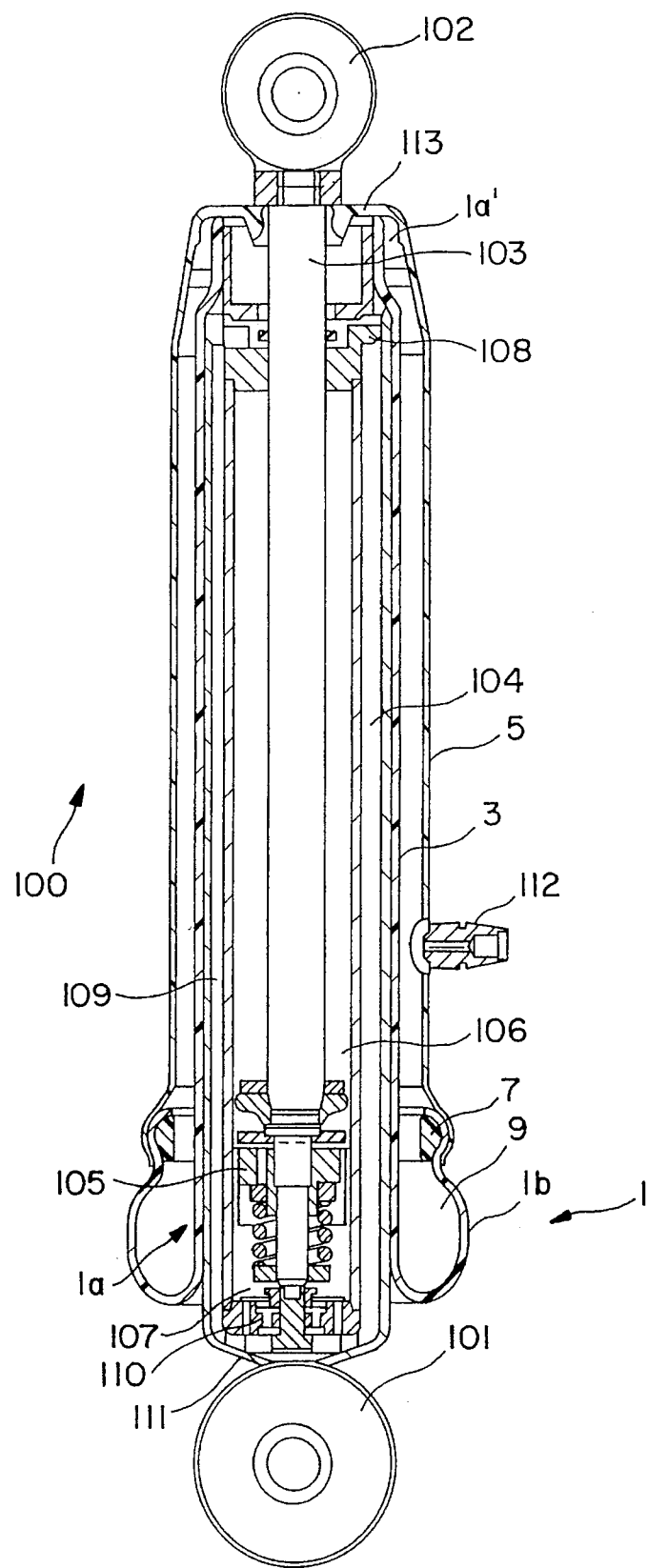
FIG. 2 shows one example of a shock absorber incorporating the pneumatic spring.

In accordance with one possible method of assembly of the pneumatic spring of the present invention, the rolling bellows 1 can preferably be placed about tubular body 3, part 1a of the rolling bellows 1 being in contact with the outside of tubular body 3 and fastened thereto by a clamping arrangement 1a' shown in FIG. 2. The retaining ring 7 can then preferably be placed about the rolling bellows 1 and tubular body 3. Part 1b of the rolling bellows 1 can then be folded backwards over part 1a towards retaining ring 7 and ends 1d (see FIG. 1a) of part 1b can preferably be pulled up and over the shell surface 7b of retaining ring 7. External tube 5 can then be placed around the rolling bellows 1 and tubular body 3. In accordance with one embodiment, the fastening segment 5a of the external tube 5, before assembly, can preferably be in the form of an angled edge, the segment 5a being angled with respect to an upper portion 5b (see FIG. 1a) of external tube 5. Thus, the fastening segment 5a can preferably extend at an angle from upper portion 5b and can extend radially outwardly towards the pneumatic spring. The fastening edge 5a and external tube 5 can then be moved downward, or towards the rolling bellows 1, and can then be bent or deformed around the ends 1d of part 1b in order to clamp part 1b into place about the retaining ring 7.

Alternatively, the fastening edge 5a could conceivably be pre-formed with the curved shape shown in FIGS. 1 and 1a, and the rolling bellows 1 can then be inserted into the external tube 5 within fastening edge 5a. Once the end 1d of the rolling bellows 1 is disposed within edge 5a, the retaining ring 7 can then be pushed into the external tube 5 in order to hold the rolling bellows 1 in place. Thus, the retaining ring 7 can "snap" into place within fastening edge 5a.

Figure 1B:
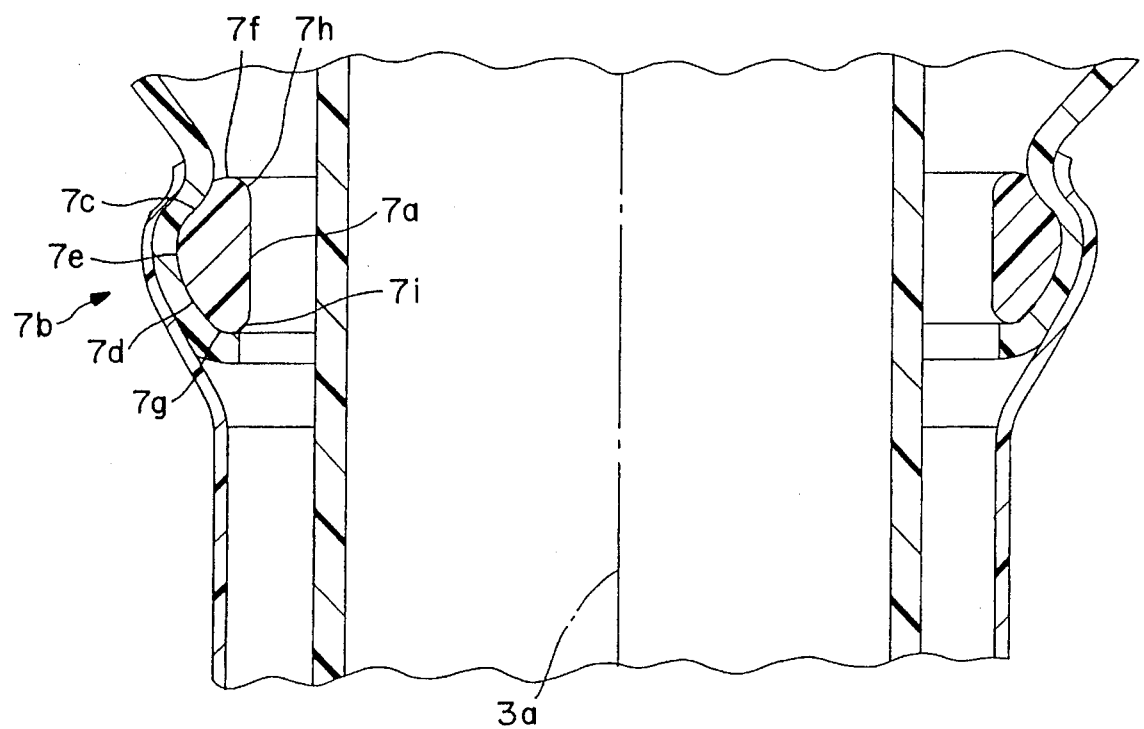
FIG. 1b shows an enlarged view of the retaining ring of the pneumatic spring.

The disclosure now turns to a more detailed description of the components of the retaining ring 7 of the present invention. FIGS. 1 and 1a may generally be considered to be scale representations of the pneumatic spring of the present invention. Possible dimensions of the retaining ring 7 will be discussed herebelow with reference to FIG. 1b. It should be noted that FIG. 1b is an enlarged view of retaining ring 7 and the surrounding structures, the view shown in FIG. 1b being about twice the size of the views shown in FIGS. 1 and 1a. Thus, any dimensions of the retaining ring 7 given herebelow with reference to FIG. 1b have been appropriately divided in half in order to apply to the scale representations shown in FIGS. 1 and 1a.

The longitudinal axis 3a (see FIGS. 1a and 1b) of tubular body 3 will be used as a reference axis and anything hereinafter referred to as "longitudinal", absent any other explanation, should be taken to be indicative of being parallel to the longitudinal axis 3a. Accordingly, anything hereinafter referred to as "transverse", absent any other explanation, should be taken as indicative of being transverse to the longitudinal axis 3a.

In a preferred embodiment of the present invention, the external contour of retaining ring 7 can generally be described as substantially convex. There can, however, preferably be two slightly concave areas 7c and 7d located on shell surface 7b, and a convex area 7e can preferably be disposed between the two concave areas 7c and 7d. Area 7c can preferably have a radius of curvature of about 9 mm. Area 7d can preferably have a radius of curvature of about 12 mm, and area 7e can have a radius of curvature of about 7 mm. There can also be transitional areas between areas 7c and 7e, and between areas 7e and 7d.

Retaining ring 7 can also preferably have two side portions 7f and 7g, which side portions 7f and 7g can be disposed opposite one another and generally transverse to the longitudinal axis 3a. Side portions 7f and 7g can both have a radius of curvature of about 2.75 mm. In addition, there can also be a transitional area between side 7f and area 7c, and between side 7g end area 7d.

Located radially inward of shell surface 7b ie surface 7a. Surface 7a can preferably be disposed substantially parallel to longitudinal axis 3a, and there can be transitional areas between side 7f and surface 7a, and between side 7g and surface 7a.

As can best be seen in FIG. 1 and 1a, retaining ring 7 can preferably extend radially inward past external tube 5 about 1 mm. Further, retaining ring 7 can preferably have a width (taken from surface 7a to area 7e) of about 5 mm, and can also have a length taken between sides 7f and 7g) of about 10 mm. Still further, the retaining ring 7 can have a diameter of about 60 mm.

Thus, in summary, retaining ring 7 can preferably have, in accordance with one preferred embodiment, concave areas 7c and 7d disposed circumferentially in shell surface 7b. Also disposed circumferentially on shell surface 7b is convex area 7e, located between areas 7c and 7d. Areas 7c and 7d can extend or taper into side portions 7f and 7g, respectively. Lastly, side portions 7f and 7g can extend or taper into surface 7a, thus forming rounded edges 7h and 7i. Rounded edges 7h and 7i of surface 7a can preferably have antifriction properties along with surface 7a, at least when the external tube 5 is in an inclined position, which can enable surface 7a to slide along part 1a of rolling bellows 1, thereby providing a guiding function as discussed further above.

In accordance with an alternative embodiment of the present invention not shown here, the retaining ring 7 can preferably have a semi-circular shape. That is, instead of having the concave areas 7c and 7d as described above with reference to FIG. 1b, the portion of the retaining ring 7 which faces away from tubular body 3 can preferably be continuously circular. Further, the retaining ring 7 can also have a flat portion similar to surface 7a. Thus, the cross-section of the retaining ring 7 in accordance with this embodiment would be a half-circle.

In accordance with yet an additional alternative embodiment not shown here, the retaining ring 7 can preferably have two essentially flat portions which preferably meet at a raised point, which raised point would correspond to area 7e discussed above. In accordance with this particular embodiment, the two flat portions can correspond to concave areas 7c and 7d discussed above, and, there can also be an additional essentially flat surface corresponding to surface 7a. Thus, this retaining ring 7 can generally have a triangular cross-section.

FIG. 2 shows one example of a complete shock absorber or vibration damper 100 which incorporates the pneumatic spring of the present invention. The shock absorber 100 can generally include the tubular body 3, the end of which tubular body 3 can preferably be equipped with a connecting mechanism 101 for attachment to a wheel mounting of a motor vehicle. The shock absorber 100 can also include an additional connecting mechanism 102 disposed a distance away from connecting mechanism 101, preferably for attachment to the body of the motor vehicle. Further, external tube 5 can preferably be disposed about the tubular body 3.

A piston rod 103 can preferably project into an inner cylinder 104 of the shock absorber 100, which inner cylinder 104 can preferably be disposed within tubular body 3. The piston rod 103 can preferably have the connection 102 for attaching the piston rod 103 to the body of the motor vehicle. A piston 105 equipped with a damping valve can be attached to one end of the piston rod 103. The piston rod 103, along with its piston 105, can preferably move axially within cylinder 104. The piston 105 divides the cylinder 104 into an upper working chamber 106 and a lower working chamber 107. The piston rod 103 can preferably be guided inside cylinder 104 by a piston rod guide 108.

The inside diameter of the tubular body 3 and the outside diameter of the cylinder 104 can preferably form an equalization chamber 109 for the cylinder 104, and the cylinder 104 can be connected to the equalization chamber via a base valve 110. The equalization chamber 109 can be connected to working chambers 106 and 107 by a passage 111 disposed between the bottom of the cylinder 104 and the inner portion of the bottom of tubular body 3.

The shock absorber 100 can also include the pneumatic spring of the present invention, which pneumatic spring can preferably be pressurized via a pressure connection 112. The pressure connection 112 can preferably be located along external tube 5.

One possible mode of operation of the pneumatic spring shown in FIG. 2 can preferably be as follows. The pneumatic spring can preferably be pressurized via pressure connection 112. Part 1a can then expand and cause movement of the external tube 5. The external tube 5 can preferably be connected to the piston rod 103 via an end piece 113. The substantially axial movement of the external tube 5 can preferably cause axial movement of the piston rod 103 to provide additional damping characteristics.

Figure 3:
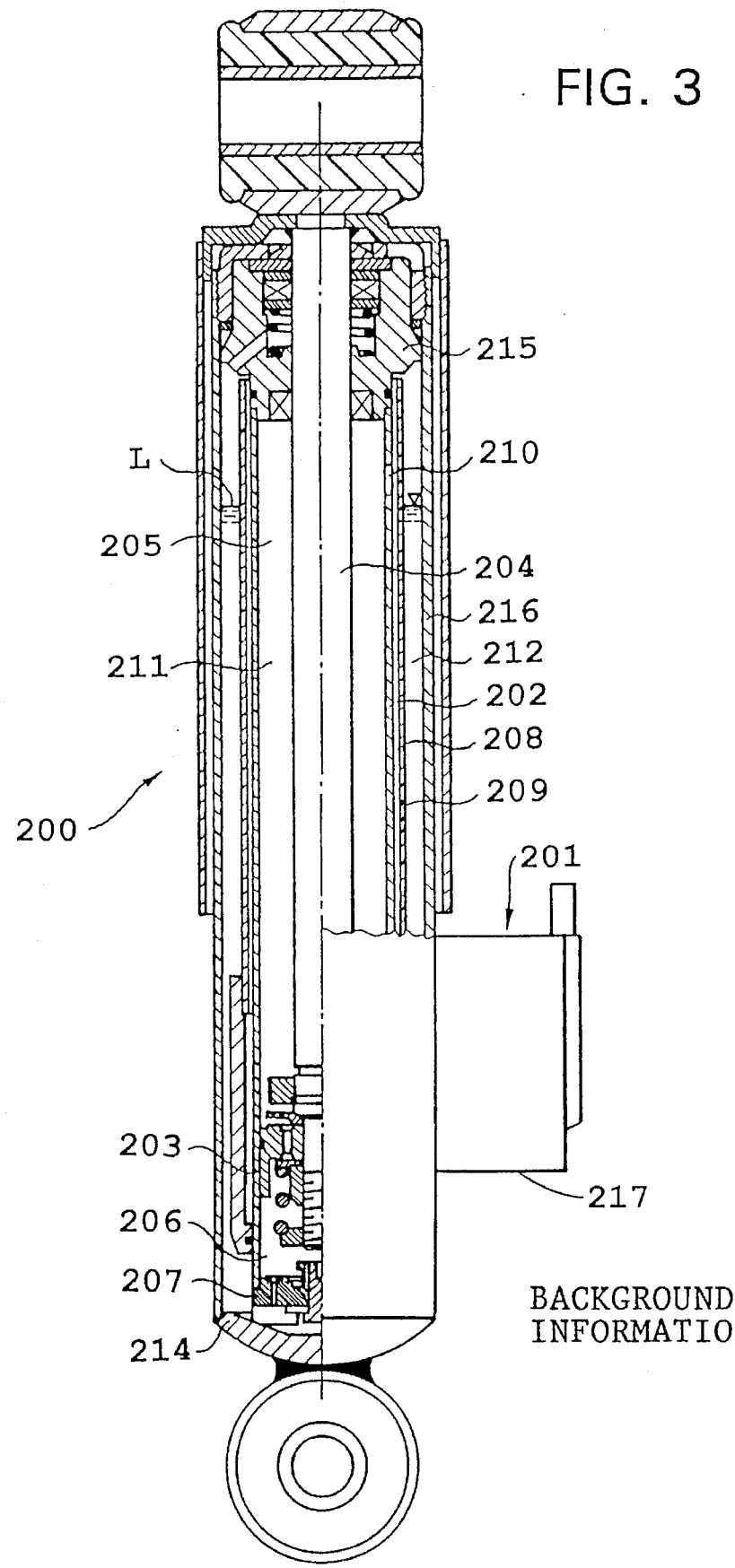
FIGS. 3 and 4 show an additional example of a shock absorber in which the present invention may be employed.
Figure 4:
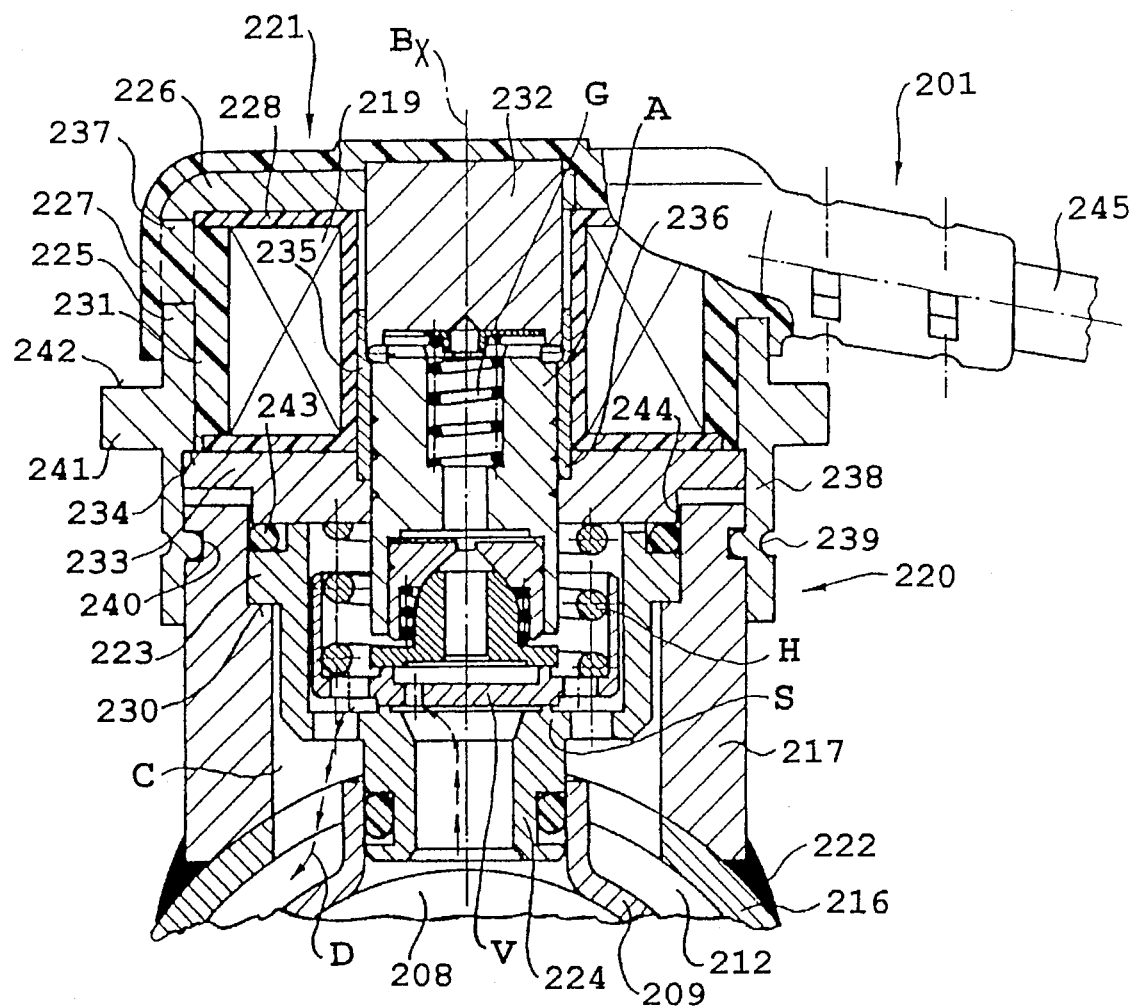

FIGS. 3 and 4 show an example of a typical shock absorber, vibration damper, or oscillation damper in which the present invention may conceivably be incorporated. It should be understood that the components found hereinbelow can be considered to be interchangeable with similar components discussed hereinabove.

FIG. 3 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On-inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 4, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 4 one can again see the fluid path 208 and the compensating chamber 212, which are interconnectable through the valve unit 201. The fluid path 208 is connected to the upper working chamber 211 as shown in FIG. 3. The flow direction from the fluid path 208 to the compensating chamber 212 across the valve unit 201 is indicated in FIG. 4 by the dotted line D provided with arrows indicating the flow direction both for inward movement and outward movement of the piston rod 204 with respect to the pressure pipe 202. One can see in FIG. 4 a valve member V which can be lifted with respect to a valve seat S, such as to open the flow path D from the fluid path 208 to the compensating chamber 212.

For explaining the principles of the embodiment of the present invention shown in FIGS. 3 and 4, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supply cable 245.

The valve unit 201 comprises a housing 220. This housing 220 ie composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron Jacket 225. This electromagnetion coil 219 ie carried by a coil carrier 228, which is annular about the axis $B_x$ and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and ie engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 4 toward the container tube 216 by a pretensioning tool engaging the container tube 216, on the one hand, and the pretensioning face 242, on the other hand. As such, the iron flange portion 233 can be pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the protensioning tool an internal preteneion is maintained. A sealing ring 243 is, therefore, maintained in sealing engagement with the valve components housing 223, the iron flange portion 233 and the side tube 217. As such, the compartment C confined by the side tube 217 and the cover unit 221 is sealed against atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that no play can occur.

One feature of the invention resides broadly in the pneumatic spring, comprising an elastic rolling bellows connected to a tubular body and together with an essentially rigid external tube forms a opting chamber, and a bellows fastening between the rolling bellows and the external tube, whereby the rolling bellows are inserted into the external tube in a fastening segment, and are held in place by means of a retaining ring, characterized by the fact that the retaining ring 7, by means of its inner surface 7a, can act as a guide with respect to the portion 1a of the rolling bellows connected to the tubular body 3, so that the external tube 5 is kept at a distance with respect to the part 1a of the rolling bellows.

Another feature of the invention resides broadly in the pneumatic spring characterized by the fact that the retaining ring 7 is made, at least on its inner surface 7a of an anti-friction material.

Yet another feature of the invention resides broadly in the pneumatic spring characterized by the fact that the retaining ring 7a has, over its entire axial length, at least one cross sectional change in the radial direction.

As discussed hereinabove, the entire retaining ring 7 and/or surface 7a of retaining ring 7, can preferably be made of an anti-friction material, such as, for example, plastic. Some specific types of plastic which could be used are polystyrenes, polyvinyl chlorides, teflon, polyethylenes, polypropylenes, and polyesters.

Alternatively, the retaining ring 7 can, in accordance with one embodiment of the present invention, be made of a metal, which metal can then be coated to provide anti-frictional properties on surface 7a. The metal retaining ring 7 can be coated with, for example, one of the plastics listed immediately above. Further examples of coatings which could be used to coat the metal retaining ring 7 may be disclosed in the following U.S. Pat. No. 5,179,174 to Elton et al. on Jan. 12, 1993, entitled "Flexible Lubricious Organic Coatings"; No. 4,647,389 to Karol et al. on Mar. 3, 1987, entitled "Anti-friction Additives for Lubricating Oils"; No. 4,650,034 to D' Avanzo on Jan. 6, 1986, entitled "Safety Escape Chute"; No. 4,758,361 to Karol on Jul. 19, 1988, entitled "Lubricating Oil of Improved Anti-friction Properties" . . . ; and No. 5,173,532 to Endo et al. on Mar. 10, 1992, entitled "Anti-friction and Wear Resistant Polyacetal Molding Compositions".

Examples of pneumatic springs, alternatively termed as "air springs" or "air shocks", and components thereof, which may be utilized in accordance with the embodiments of the present invention, may be found in the following U.S. Pat. Nos. 5,180,144, which issued to Hellyer et al. on Jan. 19, 1993; No. 5,009,401, which issued to Weitzenhof on Apr. 23, 1991; No. 4,988,082, which issued to Pees on Jan. 29, 1991; No. 4,332,397, which issued to Steger on Jun. 1, 1982; No. 4,166,522, which issued to Bourcier on Sep. 4, 1979; and No. 4,555,096, which issued to Pryor on Nov. 26, 1985.

Examples of chock absorbers, which may be utilized in accordance with the embodiments of the present invention may be found in the following U.S. Pat. No. 4,838,393, entitled "Hydro-mechanical Stop having a Restrictive Passage", which issued to Mourray et al. on Jun. 13, 1989; No. 4,817,928, entitled "Suspension System", which issued to Patch on Apr. 4, 1989; No. 4,527,674, entitled "shock Absorber with a Hydro-mechanical Stop", which issued to Mourray on Jul. 9, 1985; No. 4,962,916, entitled "Compression Spring" which issued to Palinkas on Oct. 16, 1990; and No. 4,756,516, entitled "Resiliently Deformable Element Usable as an End Stop in a Motor Vehicle Suspension", which issued to Tondato on Jul. 12, 1988.

Examples of suspension systems, which may be utilized in accordance with the embodiments of the present invention may be found in the following U.S. Pat. No. 5,286,059, entitled "Height Control System When Vehicle is Jacked Up," which issued to Tabe; No. 5,180,024, entitled "Vehicle Height Control Apparatus," which issued to Eto; No. 5,324,056, entitled "High Performance Automobile Suspension," which issued to Orton.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application Nos. P 44 07 263.5, filed on Mar. 4, 1994 and P 44 02 750.8, filed on Jan. 31, 1994, having inventors Holger Gubitz and Heinz-Joachim Gilsdorf, and DE-OS P 44 07 263.5 and P 44 02 750.8 and DE-PS P 44 07 263.5 and P 44 02 750.8 are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber assembly for a motor vehicle, said shock absorber assembly having a pneumatic spring, said shock absorber assembly comprising:

a sealed cylinder defining a chamber therein, said cylinder containing a damping medium;

said cylinder having a first end portion and a second end portion disposed a substantial distance away from said first end portion;

a piston rod sealingly projecting into said first end portion of said cylinder and being axially displaceable with respect to said cylinder;

said piston rod having a longitudinal axis defining an axial direction parallel to said longitudinal axis;

a piston attached to said piston rod, said piston being slidably disposed within said cylinder to sealingly divide said chamber into a first and second chamber;

means for permitting flow of damping medium between said first chamber and said second chamber;

an outer tube disposed about at least a portion of said cylinder;

pneumatic spring means for applying a substantially axially directed force to said outer tube;

means for fastening said pneumatic spring means to said outer tube; said pneumatic spring means comprising:

a tubular bellows portion comprising a first portion immediately surrounding and making contact with said cylinder, and a second portion for being fastened to said outer tube;

said first portion and said outer tube defining at least a portion of a spring chamber therebetween, said spring chamber for applying said substantially axially directed force to said outer tube;

means for maintaining a substantial radial distance between said outer tube and said first portion, to minimize contact between said outer tube and said first portion;

said means for maintaining comprising a retaining ring for fastening said second portion of said tubular bellows portion to said outer tube, said retaining ring being disposed about said cylinder;

said retaining ring comprising:

an inner guiding surface disposed adjacent said first portion of said tubular bellows portion;

an outer circumference disposed substantially concentrically about said longitudinal axis;

an inner circumference disposed within said outer circumference, said inner circumference comprising said inner guiding surface;

an outer portion extending substantially from said inner guiding surface to said outer circumference;

said outer portion comprising:

at least one raised portion, said at least one raised portion having a first radial dimension;

said at least one raised portion being disposed circumferentially about said outer portion;

two additional portions, said two additional portions being a first additional portion and a second additional portion;

each of said first additional portion and said second additional portion being disposed circumferentially about said outer portion, and each of said first additional portion and said second additional portion having a second radial dimension, said first radial dimension being substantially greater than said second radial dimensions of each of said first additional portion and said second additional portion;

said at least one raised portion being disposed between said first additional portion and said second additional portion; and said first additional portion and said second additional portion both comprising substantially concave portions disposed circumferentially around said outer portion.

2. The shock absorber assembly according to claim 1 wherein said retaining ring is disposed at a substantial radial distance from said first portion.

3. The shock absorber assembly according to claim 2 wherein:

said substantial radial distance between said outer tube and said first portion is a first distance; and said substantial radial distance between said retaining ring and said first portion is a second distance, said first distance being substantially greater than said second distance.

4. The shock absorber assembly according to claim 3 wherein:

said outer tube comprises:

a first end portion disposed immediately adjacent said pneumatic spring means; and a second end portion disposed at a substantial axial distance from said first end portion;

said fastening means comprises means for engaging said retaining ring, said means for engaging being disposed on said first end portion and said outer tuber; and said second portion of said tubular bellows portion is disposed to contact said outer portion of said retaining ring and said means for engaging, said second portion being clamped between said outer portion and said means for engaging.

5. The shock absorber assembly according to claim 4 wherein:
said means for engaging said retaining ring comprises a contoured shape, said contoured shape substantially corresponding to said outer portion of said retaining ring;
said piston rod comprises a first end and a second end disposed at an axial distance from said first end;
said piston is attached to said first end of said piston rod;
said shock absorber assembly further comprises:
   means for attaching said second end of said piston rod to said outer tube;
   first means for connecting said piston rod to the body of the motor vehicle;
   second means for connecting said cylinder to the suspension of the motor vehicle;
   a piston rod guide disposed within at least a portion of said cylinder; and
   means for providing pressure to said spring chamber.

6. The shock absorber assembly according to claim 5 wherein said inner guiding surface of said retaining ring comprises an anti-friction material.

7. The shock absorber assembly according to claim 6 wherein said inner guiding surface is configured for making substantially non-frictional contact with said first portion during angular displacements, with respect to said longitudinal axis, of said outer tube during operation of said shock absorber.

8. A method of assembling a shock absorber for a motor vehicle, the shock absorber assembly comprising: a sealed cylinder defining a chamber therein, the cylinder containing a damping medium; the cylinder having a first end portion and a second end portion disposed a substantial distance away from the first end portion; a piston rod sealingly projecting into the first end portion of the cylinder and being axially displaceable with respect to the cylinder; the piston rod having a longitudinal axis defining an axial direction parallel to the longitudinal axis; a piston attached to the piston rod, the piston being slidably disposed within the cylinder to sealingly divide the chamber into a first and second chamber; means for permitting flow of damping medium between the first chamber and the second chamber; an outer tube disposed about at least a portion of the cylinder; pneumatic spring means for applying a substantially axially directed force to the outer tube; means for fastening the pneumatic spring means to the outer tube; the pneumatic spring means comprising: a tubular bellows portion comprising a first portion immediately surrounding and making contact with the cylinder, and a second portion for being fastened to the outer tube; the first portion and the outer tube defining at least a portion of a spring chamber therebetween, the spring chamber for applying the substantially axially directed force to the outer tube; means for maintaining a substantial radial distance between the outer tube and the first portion, to minimize contact between the outer tube and the first portion; the means for maintaining comprising a retaining ring for fastening the second portion of the tubular bellows portion to the outer tube, the retaining ring being disposed about the cylinder; the retaining ring comprising: an inner guiding surface disposed adjacent the first portion of the tubular bellows portion; an outer circumference disposed substantially concentrically about the longitudinal axis; an inner circumference disposed within the outer circumference, the inner circumference comprising the inner guiding surface; an outer portion extending substantially from the inner guiding surface to the outer circumference; the outer portion comprising: at least one raised portion, the at least one raised portion having a first radial dimension; the at least one raised portion being disposed circumferentially about the outer portion; two additional portions, the two additional portions being a first additional portion and a second additional portion; each of the first additional portion and the second additional portion being disposed circumferentially about the outer portion, and each of the first additional portion and the second additional portion having a second radial dimension, the first radial dimension being substantially greater than the second radial dimensions of each of the first additional portion and the second additional portion; the at least one raised portion being disposed between the first additional portion and the second additional portion; and the first additional portion and the second additional portion both comprising substantially concave portions disposed circumferentially around the outer portion; said method comprising the steps of:

providing a cylinder defining a chamber therein;
providing a damping medium;
providing the cylinder with a first end portion and a second
end portion disposed a substantial distance away from the first end portion;
providing a piston rod, the piston rod having a longitudinal axis defining an axial direction parallel to the longitudinal axis;
providing a piston;
providing means for permitting flow of damping medium;
providing an outer tube;
providing pneumatic spring means for applying a substantially axially directed force to the outer tube;
providing means for fastening the pneumatic spring means to the outer tube;
said step of providing the pneumatic spring means further comprises:
   providing a tubular bellows portion;
   said step of providing the tubular bellows portion further comprises providing the tubular bellows with a first portion and a second portion;
providing means for maintaining a substantial radial distance between the outer tube and the first portion;
said step of providing the means for maintaining further comprises providing a retaining ring;
said step of providing the retaining ring further comprises:
   providing an inner guiding surface;
   providing an outer circumference disposed substantially concentrically about the longitudinal axis;
providing an inner circumference disposed within the outer circumference, the inner circumference comprising the inner guiding surface;
providing an outer portion;
extending the outer portion substantially from the inner guiding surface to the outer circumference;
providing the outer portion with:
   at least one raised portion, the at least one raised portion having a first radial dimension and being disposed circumferentially about the outer portion; and
   two additional portions, the two additional portions being a first additional portion and a second additional portion;

disposing the first and second additional portions circumferentially about the outer portion;

configuring the first and second additional portions to each have a second radial dimension, the first radial dimension being substantially greater than the second radial dimensions of each of said first additional portion and said second additional portion;

disposing the at least one raised portion between the first additional portion and the second additional portion;

said step of providing the first additional portion and the second additional portion further comprises providing each of said first additional portion and the second additional portion with substantially concave portions disposed circumferentially around the outer portion;

said method further comprising the steps of:

filling the chamber of the cylinder with damping medium;

attaching the piston to the piston rod;

inserting the piston rod and the piston into the first end portion of the cylinder, such that the piston rod sealingly projects into the first end portion of the cylinder and such that the piston sealingly divides the chamber to form a first and second chamber, the piston rod being axially displaceable with respect to the cylinder;

permitting flow of damping medium, with the means for permitting, between the first chamber and the second chamber;

disposing the first portion of the tubular bellows portion to immediately surround and make contact with the cylinder;

disposing the outer tube about at least a portion of the cylinder, the first portion and the outer tube defining at least a portion of a spring chamber therebetween, the spring chamber for applying the substantially axially directed force to the outer tube;

disposing the retaining ring about the cylinder such that the inner guiding surface of the retaining ring is adjacent the first portion of the tubular bellows portion;

fastening, with the fastening means, the second portion of the tubular bellows to the outer tube; and maintaining, with the retaining ring, a substantial radial distance between the outer tube and the first portion, and minimizing contact between the outer tube and the first portion.

9. The method according to claim 8 further comprising disposing the retaining ring at a substantial radial distance from the first portion.

10. The method according to claim 9 wherein:

the substantial radial distance between the outer tube and the first portion is a first distance; and the substantial radial distance between the retaining ring and the first portion is a second distance, the first distance being substantially greater than the second distance.

11. The method according to claim 10 wherein:

said step of providing the outer tube further comprises:

providing a first end portion;

providing a second end portion;

disposing the first end portion immediately adjacent the pneumatic spring means;

disposing the second end portion at a substantial axial distance from the first end portion;

said step of providing the fastening means further comprises:

providing means for engaging the retaining ring on the first end portion of the outer tube;

said method further comprising:

disposing the second portion of the tubular bellows portion to contact the outer portion of the retaining ring and the means for engaging; and clamping the second portion between the outer portion and the means for engaging.

12. The method according to claim 11 wherein:

said step of providing the means for engaging the retaining ring further comprises providing a contoured shape, the contoured shape substantially corresponding to the outer portion of the retaining ring;

said step of providing the piston rod further comprises providing a first end and a second end;

disposing the second end at an axial distance from the first end;

said step of attaching the piston to the piston rod further comprises attaching the piston to the first end of the piston rod;

said method further comprises:

providing means for attaching the second end of the piston rod to the outer tube;

attaching, with the attaching means, the second end of the piston rod to the outer tube;

providing first means for connecting the piston rod to the body of the motor vehicle;

providing second means for connecting the cylinder to the suspension of the motor vehicle;

providing a piston rod guide;

disposing the piston rod guide within at least a portion of the cylinder; and providing means for providing pressure to the spring chamber.

13. The method according to claim 12 wherein said step of providing the retaining ring further comprises providing the inner guiding surface with an anti-friction material.

14. The method according to claim 13 further comprising:

configuring the inner guiding surface for making substantially non-frictional contact with the first portion during angular displacements, with respect to the longitudinal axis, of the outer tube during operation of the shock absorber.

* * * * *

UNITED STATES PATENT AND TRADEMARK OFFICE
CERTIFICATE OF CORRECTION

PATENT NO. : 5,575,360                        Page 1 of 2
DATED : November 19, 1996
INVENTOR(S) : Holger GUBITZ and Heinz-Joachim GILSDORF It is certified that error appears in the above-indentified patent and that said Letters Patent is hereby corrected as shown below:

In column 1, line 24, after 'which' insert --is--.

In column 1, line 34, after 'of' insert --the past can be essentially eliminated using relatively simple means.--.

In column 2, line 59, after 'the', delete "cheer" and insert --chamber--.

In column 5, line 39, after '7g', delete "end" and insert --and--.

In column 5, line 40, after '7b', delete "ie" and insert --is--.

In column 5, line 49, after 'length', delete "taken" and insert --(taken--.

In column 7, line 45, before 'movement', delete "On-inward" and insert --On inward--.

In column 8, line 57, after '220', delete "ie" and insert --is--.

In column 9, line 5, after 'This', delete "electromagnetion" and insert --electromagnetic--.

In column 9, line 5, after '219', delete "ie" and insert --is--.

UNITED STATES PATENT AND TRADEMARK OFFICE
CERTIFICATE OF CORRECTION

PATENT NO. : 5,575,360
DATED : November 19, 1996
INVENTOR(S) : Holger GUBITZ and Heinz-Joachim GILSDORF It is certified that error appears in the above-indentified patent and that said Letters Patent is hereby corrected as shown below:

In column 9, line 18, after 'and', delete "ie" and insert --is--.

In column 9, lines 53-54, after 'internal', delete "preteneion" and insert --pretension--.

In column 10, line 9, after the first occurrence of 'a', delete "opting" and insert --spring--.

In column 12, line 66, Claim 4, after 'outer', delete "tuber;" and insert --tube;--.

Signed and Sealed this

Eleventh Day of March, 1997

Attest:

BRUCE LEHMAN

Attesting Officer

Commissioner of Patents and Trademarks